US011627389B2

(12) United States Patent
Koravadi

(10) Patent No.: US 11,627,389 B2
(45) Date of Patent: *Apr. 11, 2023

(54) VEHICULAR VISION SYSTEM WITH INFRARED EMITTER SYNCHRONIZATION

(71) Applicant: Magna Electronics Inc., Auburn Hills, MI (US)

(72) Inventor: Krishna Koravadi, Rochester Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/649,372

(22) Filed: Jan. 31, 2022

(65) Prior Publication Data

US 2022/0159181 A1    May 19, 2022

Related U.S. Application Data

(63) Continuation of application No. 17/249,998, filed on Mar. 22, 2021, now Pat. No. 11,240,427, which is a continuation of application No. 16/411,170, filed on May 14, 2019, now Pat. No. 10,958,830.

(60) Provisional application No. 62/675,969, filed on May 24, 2018.

(51) Int. Cl.
*H04N 23/67* (2023.01)
*H04N 23/60* (2023.01)
*H04N 23/56* (2023.01)
*H04N 23/65* (2023.01)
*B60R 1/12* (2006.01)
(Continued)

(52) U.S. Cl.
CPC .......... *H04N 23/665* (2023.01); *H04N 23/56* (2023.01); *H04N 23/651* (2023.01); *B60R 1/00* (2013.01); *B60R 1/12* (2013.01); *B60R 2001/1215* (2013.01); *B60R 2001/1253* (2013.01); *B60R 2300/105* (2013.01); *B60R 2300/106* (2013.01); *H04N 23/90* (2023.01)

(58) Field of Classification Search
CPC ......... H04N 5/23227; H04N 5/232411; H04N 5/2256; H04N 23/665; H04N 23/56; H04N 23/651; B60R 2300/106
See application file for complete search history.

(56) References Cited

U.S. PATENT DOCUMENTS 5,550,677 A   8/1996 Schofield et al.
5,670,935 A   9/1997 Schofield et al.
5,949,331 A   9/1999 Schofield et al.
(Continued)

*Primary Examiner* — Brian P Yenke
(74) *Attorney, Agent, or Firm* — Honigman LLP

(57) ABSTRACT

A vehicular vision system includes a camera having a field of view interior of a vehicle equipped with the vehicular vision system, a plurality of infrared light emitters operable to illuminate a region at least partially within the field of view of the camera, and an electronic control unit having an image processor that processes image data captured by the camera. The camera captures frames of image data at a first rate, and infrared light emitters of the plurality of infrared light emitters are pulsed at a second rate. The first rate is different than the second rate. For a driving assist function of the vehicle, capture of frames of image data by the camera at the first rate is synchronized with pulsing of the infrared light emitters of the plurality of infrared light emitters at the second rate.

18 Claims, 3 Drawing Sheets

(51) Int. Cl.
  *B60R 1/00* (2022.01)
  *H04N 23/90* (2023.01)

(56) References Cited

U.S. PATENT DOCUMENTS

| | | | |
|---|---|---|---|
| 6,690,268 | B2 | 2/2004 | Schofield et al. |
| 6,944,458 | B2 | 9/2005 | Jami et al. |
| 7,038,577 | B2 | 5/2006 | Pawlicki et al. |
| 7,195,381 | B2 | 3/2007 | Lynam et al. |
| 7,199,767 | B2 | 4/2007 | Spero |
| 7,720,580 | B2 | 5/2010 | Higgins-Luthman |
| 7,855,755 | B2 | 12/2010 | Weller et al. |
| 8,305,447 | B1 | 11/2012 | Wong |
| 8,981,966 | B2 | 3/2015 | Stein et al. |
| 9,061,632 | B2 | 6/2015 | Toyofuku |
| 9,128,290 | B2 | 9/2015 | Kim |
| 9,481,301 | B2 | 11/2016 | Schaffner |
| 9,674,490 | B2 | 6/2017 | Koravadi |
| 9,701,246 | B2 | 7/2017 | Turk |
| 9,906,766 | B2 | 2/2018 | Takahashi et al. |
| 10,225,445 | B2 | 3/2019 | Lautenbach |
| 10,250,825 | B2 | 4/2019 | Sun |
| 10,616,463 | B2 | 4/2020 | Johannessen et al. |
| 10,652,477 | B2 * | 5/2020 | Yamamoto ........... H04N 5/2256 |
| 10,674,081 | B2 | 6/2020 | Zhou et al. |
| 10,682,966 | B2 | 6/2020 | Koravadi |
| 10,742,890 | B2 | 8/2020 | Nakata |
| 10,791,259 | B2 * | 9/2020 | Schoenen ........... H04B 10/1149 |
| 10,868,967 | B2 | 12/2020 | Kanayama et al. |
| 10,958,830 | B2 | 3/2021 | Koravadi |
| 11,240,427 | B2 | 2/2022 | Koravadi |
| 2002/0070342 | A1 | 6/2002 | Berenz et al. |
| 2003/0025793 | A1 | 2/2003 | McMahon |
| 2003/0142850 | A1 | 7/2003 | Eggers et al. |
| 2004/0257442 | A1 | 12/2004 | Eggers et al. |
| 2005/0247862 | A1 * | 11/2005 | Faytlin ..................... B60R 1/00 250/214 VT |
| 2007/0273611 | A1 | 11/2007 | Torch |
| 2009/0072996 | A1 | 3/2009 | Schoepp |
| 2010/0019151 | A1 * | 1/2010 | Shimizu ............. H04N 5/35572 250/330 |
| 2012/0062743 | A1 | 3/2012 | Lynam et al. |
| 2013/0176329 | A1 | 7/2013 | Toyoda et al. |
| 2014/0192181 | A1 | 7/2014 | Taylor et al. |
| 2015/0244908 | A1 | 8/2015 | Laroia et al. |
| 2016/0082887 | A1 * | 3/2016 | Turk ........................ B60R 1/00 701/300 |
| 2017/0104939 | A1 | 4/2017 | Sun |
| 2017/0113613 | A1 | 4/2017 | Van Dan Elzen et al. |
| 2017/0180615 | A1 | 6/2017 | Lautenbach |
| 2017/0237887 | A1 | 8/2017 | Tanaka et al. |
| 2017/0257617 | A1 | 9/2017 | Retterath |
| 2018/0167551 | A1 | 6/2018 | Koravadi |
| 2018/0324367 | A1 * | 11/2018 | Siddiqui ................ H04N 5/243 |
| 2019/0011564 | A1 | 1/2019 | Kwon et al. |
| 2019/0041642 | A1 | 2/2019 | Haddick et al. |
| 2019/0082107 | A1 * | 3/2019 | Zhou ........................ H04N 5/33 |
| 2019/0143908 | A1 | 5/2019 | Koravadi |
| 2019/0273858 | A1 | 9/2019 | Nakata |
| 2020/0001774 | A1 | 1/2020 | Kim |
| 2020/0099914 | A1 * | 3/2020 | Otsubo ................ H04N 13/106 |
| 2020/0101906 | A1 | 4/2020 | Kobayashi et al. |
| 2020/0122631 | A1 | 4/2020 | Huizen et al. |
| 2020/0247331 | A1 | 8/2020 | Bigoness et al. |
| 2021/0235011 | A1 * | 7/2021 | Zhao ................... H04N 23/667 |
| 2021/0306546 | A1 * | 9/2021 | Jönsson ............... H04N 23/667 |
| 2022/0172511 | A1 * | 6/2022 | He ........................ H04N 23/56 |

\* cited by examiner

FIG. 3
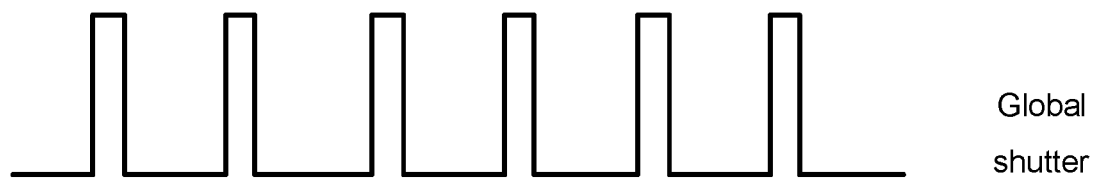
Global shutter
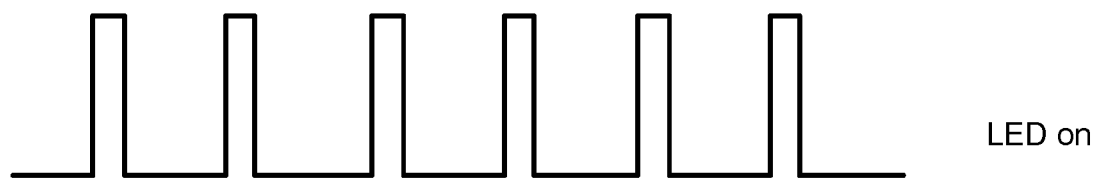
LED on
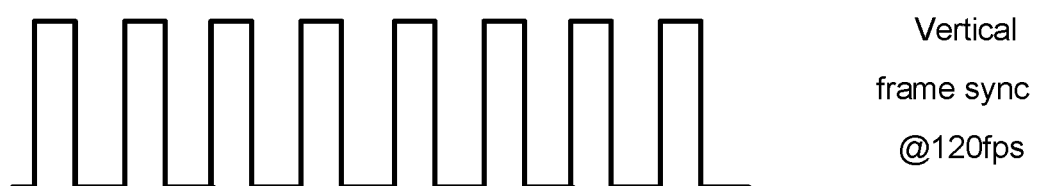
Vertical frame sync @120fps
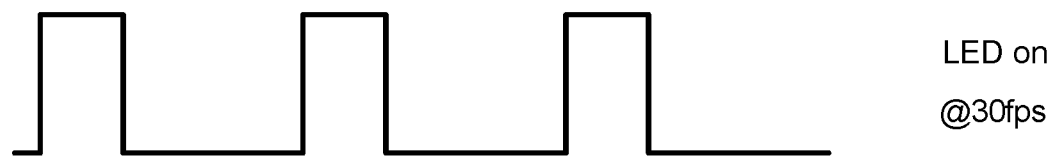
LED on @30fps
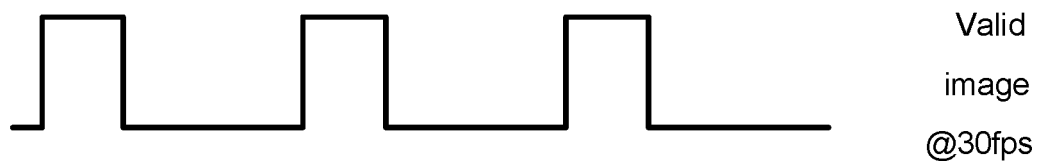
Valid image @30fps
FIG. 4

VEHICULAR VISION SYSTEM WITH INFRARED EMITTER SYNCHRONIZATION

CROSS REFERENCE TO RELATED APPLICATIONS

The present application is a continuation of U.S. patent application Ser. No. 17/249,998, filed Mar. 22, 2021, now U.S. Pat. No. 11,240,427, which is a continuation of U.S. patent application Ser. No. 16/411,170, filed May 14, 2019, now U.S. Pat. No. 10,958,830, which claims the filing benefits of U.S. provisional application Ser. No. 62/675,969, filed May 24, 2018, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, and provides a method and apparatus to control the ON status of one or more infrared (IR) or near IR light emitting diodes (LEDs) synchronized with the camera imager to minimize the power consumption of the camera.

These and other objects, advantages, purposes and features of the present invention will become apparent upon review of the following specification in conjunction with the drawings.

BRIEF DESCRIPTION OF THE DRAWINGS

FIG. 3 is a graph showing the IR LEDs controlled using the global shutter signal; and FIG. 4 is a graph showing the imager and IR LEDs operating at different frame rates.

LEGEND

10—Vehicle
12—Vision System
14a-d—Cameras
16—Display device
18—ECU
20—Mirror assembly
100—Application processor
102—Imager
104—Lens
106—IR LEDs to illuminate region encompassed by camera field of view
110—IR LED driver
112—Sync signal between the imager and the IR LED driver

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
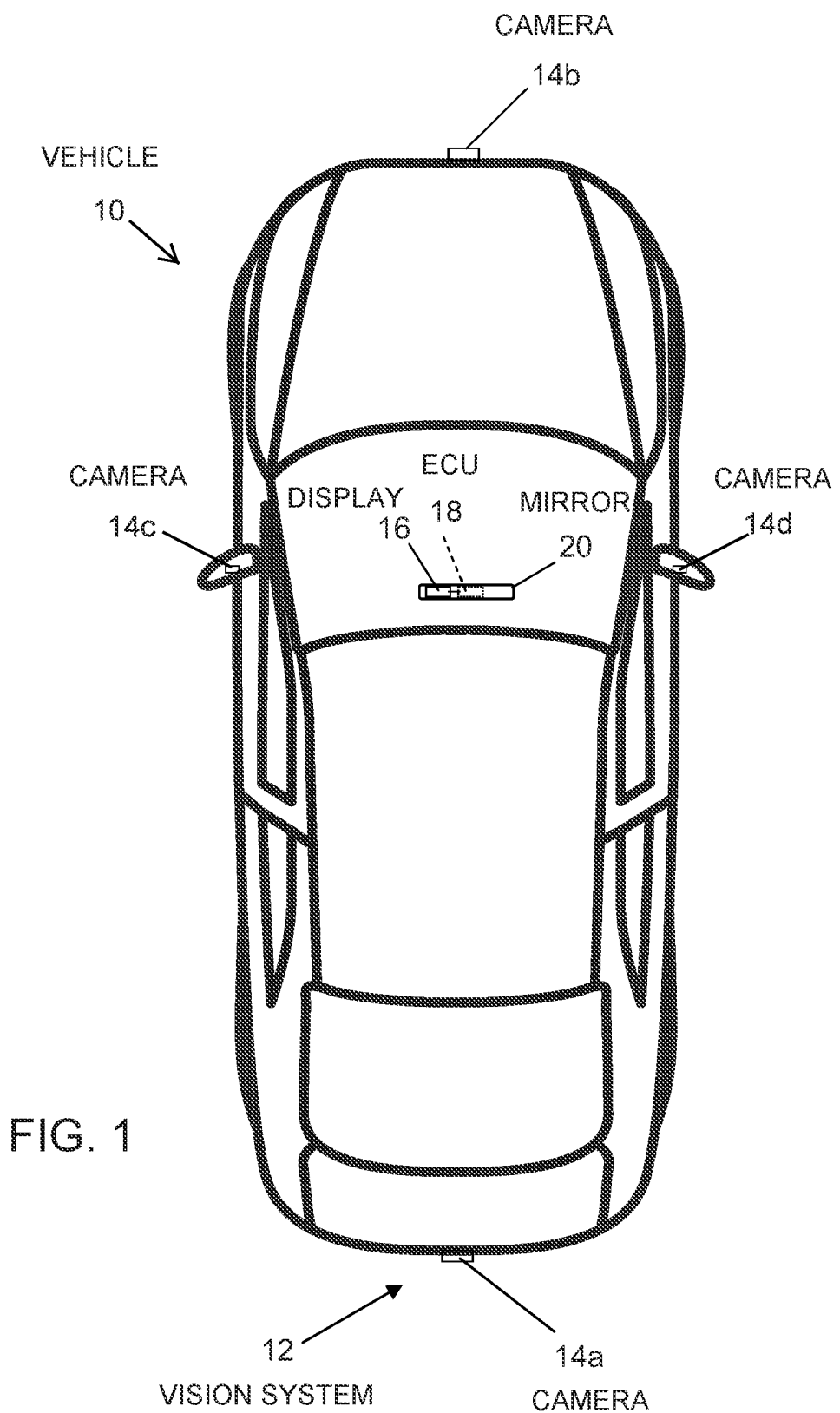
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
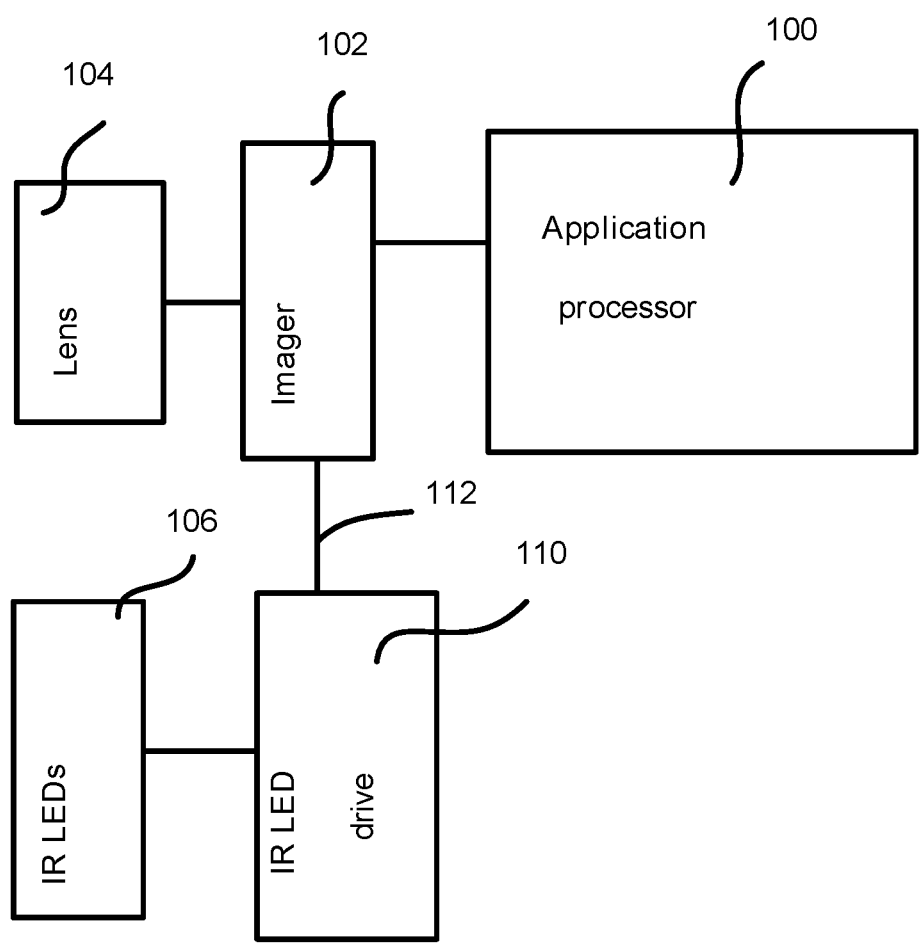
FIG. 2 is a schematic of a system that synchronizes IR LEDs with an imager in accordance with the present invention.

FIG. 1 illustrates a block diagram of a night vision camera system in which one or more of the IR LEDs 106 are synced with the imager 102. The IR LEDs' driver circuit 110 receives the synchronizing signal 112 from the imager 102 or application processor 100. The synchronization signal 112 could be global shutter or global reset or vertical frame sync signal from the imager 102, such as shown in FIGS. 2 and 3.

As the IR LEDs 106 are power hungry, it is very important to reduce the ON or higher power time of the IR LEDs 106. To get the best image, the IR LEDs needs to be ON for the exposure time of the imager 102. If the imager 102 is operated at a higher frame capture rate (such as, for example, 120 frames per second (fps)) and the IR LEDs 106 are operated at a lower frame capture rate (such as, for example, 30 fps), and if both are synchronized as shown in FIG. 3 and the application uses only the image data captured when the scene is illuminated by the IR LEDs 106 (e.g., every fourth frame of captured image data in this example), then the system can save about three quarters of IR LED power compared to when both the IR LEDs and the imager are operated at the same frame rate.

Thus, the system of the present invention functions to operate the LEDs and the camera at different rates, with the LEDs being operated at a slower rate than the camera. The system then only uses (such as for a particular driving assist system of the vehicle) the frames of image data captured by the camera when the IR LEDs are operated. The frame rate of the camera is a multiple of the frame rate of the LEDs (e.g., 2 times, 3 times, 4 times, etc.), such that every other, or every third, or every fourth frame of image data captured by the camera will be captured when the IR LEDs are actuated and thus illuminating the region encompassed by the field of view of the camera (with the other frames of image data captured when the IR LEDs are off or at reduced power). Thus, the system uses less power to operate the IR LEDs, while capturing image data when the field of view is illuminated by the IR illumination or radiation emitted by the IR LEDs.

The system thus utilizes image data captured by the camera when the scene is illuminated by IR illumination (when the IR LEDs are pulsed on) for a particular driving assist function (such as a night vision function and such as for object detection or pedestrian detection or a backup assist function at night or low ambient lighting conditions). The system may utilize image data captured by the camera when the scene is not illuminated by IR illumination (when the IR LEDs are pulsed off) for a different driving assist function (such as, for example, headlamp control or the like). The system may pulse the IR LEDs on and off at a rate that is a multiple of the camera's image data capture rate or may pulse the IR LEDs from a higher power and a lower power at a rate that is a multiple of the camera's image data capture rate or may pulse the IR LEDs, depending on the particular application.

The system may operate or energize the LEDs (such as an array of LEDs) to provide a flood light function to illuminate a large area at or near the vehicle. The system may, when the flood light function is not in operation, energize one (or more) of the LEDs synchronized with the camera's capture rate. Thus, the system may provide a flood light function (such as to assist a person in viewing the illuminated area) and may provide a reduced illumination function, with the camera capturing image data for the driving assist systems when the LED/LEDs are operating in the reduced illumination mode (where only one or two or some number less than the entirety of the LEDs is operated). The LEDs thus may operate to provide a flood light (where all of the LEDs are operated) and may be pulsed (where only one or more of the LEDs are pulsed) to provide the synchronization with the camera.

The camera or sensor may comprise any suitable camera or sensor and may be a forward viewing or rearward viewing or sideward viewing camera disposed at the vehicle. The system may utilize multiple cameras and multiple IR LEDs (with one or more LEDs disposed at or near each camera for at least partially illuminating the field of view of the respective camera.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472;

US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system, said vehicular vision system comprising:
    a camera having a field of view interior of a vehicle equipped with said vehicular vision system, wherein said camera comprises a CMOS imaging array having at least one million photosensor elements arranged in rows and columns;
    a plurality of infrared light emitters operable to illuminate a region at least partially within the field of view of said camera:
    an electronic control unit (ECU) comprising an image processor that processes image data captured by said camera;
    wherein said camera captures frames of image data at a first rate;
    wherein infrared light emitters of said plurality of infrared light emitters are pulsed at a second rate:
    wherein the first rate is different than the second rate; and
    wherein, for a first driving assist function of the vehicle, capture of frames of image data by said camera at the first rate is synchronized with pulsing of the infrared light emitters of said plurality of infrared light emitters at the second rate;
    wherein said image processor processes, for the first driving assist function of the vehicle, first frames of image data captured by said camera when the region is illuminated by operation of the infrared light emitters of said plurality of infrared light emitters; and
    wherein said image processor processes second frames of image data captured by said camera in between pulses of the infrared light emitters of said plurality of infrared light emitters when the region is not illuminated by operation of the infrared light emitters of said plurality of infrared light emitters for a second driving assist function of the vehicle, and wherein the second driving assist function is different than the first driving assist function.

2. The vehicular vision system of claim 1, wherein said image processor processes first frames of image data captured by said camera when the region is illuminated by operation of the infrared light emitters of said plurality of infrared light emitters in low ambient lighting conditions.

3. The vehicular vision system of claim 1, wherein the first rate is at least two times the second rate.

4. The vehicular vision system of claim 1, wherein the second rate is 30 pulses per second of the infrared light emitters of said plurality of infrared light emitters, and wherein the first rate is 60 frames per second.

5. The vehicular vision system of claim 1, wherein the second rate is 30 pulses per second of the infrared light emitters of said plurality of infrared light emitters, and wherein the first rate is 90 frames per second.

6. The vehicular vision system of claim 1, wherein the second rate is 30 pulses per second of the infrared light emitters of said plurality of infrared light emitters, and wherein the first rate is 120 frames per second.

7. The vehicular vision system of claim 1, wherein the infrared light emitters of said plurality of infrared light emitters are pulsed on and off at the second rate.

8. The vehicular vision system of claim 1, wherein said plurality of infrared light emitters comprises a plurality of infrared light emitting diodes.

9. The vehicular vision system of claim 1, wherein said camera is disposed at a windshield of the vehicle.

10. The vehicular vision system of claim 1, wherein said image processor comprises an image processing chip.

11. A vehicular vision system, said vehicular vision system comprising:
    a camera having a field of view interior of a vehicle equipped with said vehicular vision system, wherein said camera comprises a CMOS imaging array having at least one million photosensor elements arranged in rows and columns;
    a plurality of infrared light emitters operable to illuminate a region at least partially within the field of view of said camera:
    an electronic control unit (ECU) comprising an image processor that processes image data captured by said camera;
    wherein said image processor comprises an image processing chip;
    wherein said camera captures frames of image data at a first rate;
    wherein infrared light emitters of said plurality of infrared light emitters are pulsed at a second rate:
    wherein the first rate is at least two times the second rate;
    wherein, for a first driving assist function of the vehicle, capture of frames of image data by said camera at the first rate is synchronized with pulsing of the infrared light emitters of said plurality of infrared light emitters at the second rate;
    wherein said image processor processes, for the first driving assist function of the vehicle, first frames of image data captured by said camera when the region is illuminated by operation of the infrared light emitters of said plurality of infrared light emitters; and
    wherein said image processor processes second frames of image data captured by said camera in between pulses of the infrared light emitters of said plurality of infrared light emitters when the region is not illuminated by operation of the infrared light emitters of said plurality of infrared light emitters for a second driving assist function of the vehicle, and wherein the second driving assist function is different than the first driving assist function.

12. The vehicular vision system of claim 11, wherein said image processor processes first frames of image data captured by said camera when the region is illuminated by operation of the infrared light emitters of said plurality of infrared light emitters in low ambient lighting conditions.

13. The vehicular vision system of claim 11, wherein the infrared light emitters of said plurality of infrared light emitters are pulsed on and off at the second rate.

14. The vehicular vision system of claim 11, wherein said plurality of infrared light emitters comprises a plurality of infrared light emitting diodes.

15. A vehicular vision system, said vehicular vision system comprising:
- a camera having a field of view interior of a vehicle equipped with said vehicular vision system, wherein said camera comprises a CMOS imaging array having at least one million photosensor elements arranged in rows and columns;
- wherein said camera is disposed at a windshield of the vehicle;
- a plurality of infrared light emitters operable to illuminate a region at least partially within the field of view of said camera:
- an electronic control unit (ECU) comprising an image processor that processes image data captured by said camera;
- wherein said camera captures frames of image data at a first rate;
- wherein infrared light emitters of said plurality of infrared light emitters are pulsed at a second rate:
- wherein the first rate is at least two times the second rate;
- wherein, for a first driving assist function of the vehicle, capture of frames of image data by said camera at the first rate is synchronized with pulsing of the infrared light emitters of said plurality of infrared light emitters at the second rate;
- wherein said image processor processes, for the first driving assist function of the vehicle, first frames of image data captured by said camera when the region is illuminated by operation of the infrared light emitters of said plurality of infrared light emitters; and
- wherein said image processor processes second frames of image data captured by said camera in between pulses of the infrared light emitters of said plurality of infrared light emitters when the region is not illuminated by operation of the infrared light emitters of said plurality of infrared light emitters for a second driving assist function of the vehicle, and wherein the second driving assist function is different than the first driving assist function.

16. The vehicular vision system of claim 15, wherein said image processor processes first frames of image data captured by said camera when the region is illuminated by operation of the infrared light emitters of said plurality of infrared light emitters in low ambient lighting conditions.

17. The vehicular vision system of claim 15, wherein the infrared light emitters of said plurality of infrared light emitters are pulsed on and off at the second rate.

18. The vehicular vision system of claim 15, wherein said plurality of infrared light emitters comprises a plurality of infrared light emitting diodes.

* * * * *